United States Patent
Donderici

(10) Patent No.: US 12,416,740 B2
(45) Date of Patent: Sep. 16, 2025

(54) USE OF LOW FREQUENCY ELECTROMAGNETIC SIGNALS TO DETECT OCCLUDED ANOMALIES BY A VEHICLE

(71) Applicant: GM Cruise Holdings LLC, San Francisco, CA (US)

(72) Inventor: Burkay Donderici, Burlingame, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 626 days.

(21) Appl. No.: 17/590,901

(22) Filed: Feb. 2, 2022

(65) Prior Publication Data
US 2023/0243994 A1    Aug. 3, 2023

(51) Int. Cl.
*G01V 3/08* (2006.01)
*B60W 60/00* (2020.01)
*G01S 13/931* (2020.01)

(52) U.S. Cl.
CPC .............. *G01V 3/08* (2013.01); *G01S 13/931* (2013.01); *B60W 60/0013* (2020.02); *B60W 2720/10* (2013.01)

(58) Field of Classification Search
CPC .. G01S 313/931; G01V 3/08; B60W 60/0013; B60W 2720/10
See application file for complete search history.

(56) References Cited

U.S. PATENT DOCUMENTS

| | | | | |
|---|---|---|---|---|
| 3,835,371 A | * | 9/1974 | Mirdadian | G01V 3/10 324/329 |
| 3,870,948 A | * | 3/1975 | Holt | H03K 17/9502 331/65 |
| 4,087,782 A | * | 5/1978 | Oishi | B60R 21/0136 340/540 |

(Continued)

FOREIGN PATENT DOCUMENTS

WO    WO 2020132676 A2    6/2020

OTHER PUBLICATIONS

Extended European Search Report dated Jun. 6, 2023, for the corresponding European Patent Application No. 23152392.9.

*Primary Examiner* — Peter M Bythrow

(57) ABSTRACT

The present technology is directed to a sensor system. The sensor system may include a transmitter on a vehicle configured to transmit an electromagnetic signal in the frequency range 0.1 Hz to 10 kHz resulting in an electromagnetic field. The sensor system may also include a receiver on the vehicle configured to receive a secondary electromagnetic signal from a metallic or conductive object surrounding the vehicle, wherein the secondary electromagnetic signal represents the disturbance the electromagnetic field created by the electromagnetic signal from the vehicle. The present technology is also directed to a processor configured to determine that the magnitude of the disturbance caused by the secondary electromagnetic field is above a threshold. When the magnitude of the disturbance is above a threshold, it can be reasoned that there is an anomaly causing the disturbance that is likely a large metallic object. In some environments, it can be inferred that the disturbance is likely a second vehicle near the first vehicle.

19 Claims, 8 Drawing Sheets

(56) References Cited

U.S. PATENT DOCUMENTS

| | | | | |
|---|---|---|---|---|
| 5,394,292 | A * | 2/1995 | Hayashida | H03K 17/955 340/904 |
| 5,629,619 | A * | 5/1997 | Mednikov | G01D 5/202 324/207.16 |
| 5,760,577 | A * | 6/1998 | Shizuya | G01F 23/20 324/207.16 |
| 5,802,479 | A * | 9/1998 | Kithil | B60R 21/233 257/295 |
| 6,058,339 | A * | 5/2000 | Takiguchi | G05D 1/0246 701/28 |
| 6,203,060 | B1 * | 3/2001 | Cech | G01P 15/11 180/274 |
| 6,275,146 | B1 * | 8/2001 | Kithil | B60N 2/0026 340/439 |
| 6,348,862 | B1 * | 2/2002 | McDonnell | G01V 3/088 340/561 |
| 6,441,623 | B1 * | 8/2002 | Moon | B60Q 9/007 324/661 |
| 6,476,605 | B1 * | 11/2002 | de Coulon | G01D 5/2053 324/207.17 |
| 6,631,776 | B1 * | 10/2003 | Bomya | G01V 3/08 340/904 |
| 6,750,624 | B2 * | 6/2004 | Haag | E05F 15/46 361/301.1 |
| 6,879,250 | B2 * | 4/2005 | Fayt | H01Q 1/38 280/727 |
| 6,967,574 | B1 * | 11/2005 | Nelson | F41H 11/16 340/552 |
| 7,190,161 | B2 * | 3/2007 | Bomya | G01B 7/24 324/228 |
| 7,359,782 | B2 * | 4/2008 | Breed | G01S 17/931 710/48 |
| 7,772,839 | B2 * | 8/2010 | Watson | G01D 5/202 324/228 |
| 8,180,585 | B2 * | 5/2012 | Cech | B60R 21/0136 324/228 |
| 8,791,801 | B2 * | 7/2014 | Aubry | G01V 3/088 340/436 |
| 9,709,376 | B2 * | 7/2017 | Zhe | G01B 7/023 |
| 10,775,481 | B1 * | 9/2020 | Puglielli | G01S 7/4091 |
| 2003/0062891 | A1 * | 4/2003 | Slates | G01D 5/2053 324/207.26 |
| 2005/0099278 | A1 * | 5/2005 | Kawaura | B60R 21/013 324/207.26 |
| 2007/0188168 | A1 * | 8/2007 | Stanley | G01R 33/09 324/228 |
| 2011/0156890 | A1 * | 6/2011 | Aubry | G01V 3/088 340/435 |
| 2016/0223663 | A1 * | 8/2016 | Schmalenberg | G01S 17/931 |
| 2017/0174093 | A1 * | 6/2017 | Oettle | G01S 13/88 |
| 2018/0319323 | A1 | 11/2018 | Salter et al. | |

* cited by examiner

USE OF LOW FREQUENCY ELECTROMAGNETIC SIGNALS TO DETECT OCCLUDED ANOMALIES BY A VEHICLE

TECHNICAL FIELD

The subject technology pertains to using low frequency electromagnetic signals to detected occluded anomalies by a vehicle and further pertains to using body parts of a vehicle as an antenna for transmitting and detecting the low frequency electromagnetic signals to detect occluded anomalies.

BACKGROUND

An autonomous vehicle (AV) is a motorized vehicle that can navigate without a human driver. An exemplary autonomous vehicle includes a plurality of sensor systems, including a camera sensor system, a Light Detection and Ranging (LiDAR) sensor system, a radar sensor system, amongst others, wherein the autonomous vehicle operates based upon sensor signals output by the sensor systems. Specifically, the sensor signals are provided to an internal computing system in communication with the plurality of sensor systems, wherein a processor executes instructions based upon the sensor signals to control a mechanical system of the autonomous vehicle, such as a vehicle propulsion system, a braking system, or a steering system. In some applications, these systems utilize a perception system (or perception stack) that implements various computing vision techniques to reason about the surrounding environment.

SUMMARY in one aspect, the present technology is directed to a sensor system. The sensor system may include a transmitter on a vehicle configured to transmit an electromagnetic signal in the frequency range 0.1 Hz to 10 kHz resulting in an electromagnetic field. The sensor system may also include a receiver on the vehicle configured to receive a secondary electromagnetic signal from a metallic or conductive object surrounding the vehicle, wherein the secondary electromagnetic signal represents the disturbance the electromagnetic field created by the electromagnetic signal from the vehicle. The present technology is also directed to a processor configured to determine that the magnitude of the disturbance caused by the secondary electromagnetic field is above a threshold. When the magnitude of the disturbance is above a threshold, it can be reasoned that there is an anomaly causing the disturbance that is likely a large metallic object. In some environments, it can be inferred that the disturbance is likely a second vehicle near the first vehicle.

In another aspect, the present technology is directed to using an electromagnetic signal to detect an occluded object. The present technology may include initiating a transmitter of a first vehicle, by a processor, to induce a transmitted electromagnetic signal. The present technology may also include receiving secondary electromagnetic signals generated in an environment measured by a receiver on the first vehicle, wherein the secondary electromagnetic signals are generated by the transmitted electromagnetic signal interacting with metallic objects in the environment. The present technology may further include determining that an anomaly exists in the environment when the measured secondary electromagnetic signals are different by greater than a threshold amount than the transmitted electromagnetic signal induced by the transmitter of the first vehicle.

Additional aspects, embodiments, and features are set forth in part in the description that follows and will become apparent to those skilled in the art upon examination of the specification or may be learned by the practice of the disclosed subject matter. A further understanding of the nature and advantages of the disclosure may be realized by reference to the remaining portions of the specification and the drawings, which form a part of this disclosure.

BRIEF DESCRIPTION OF THE DRAWINGS

The above-recited and other advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Figure 1:
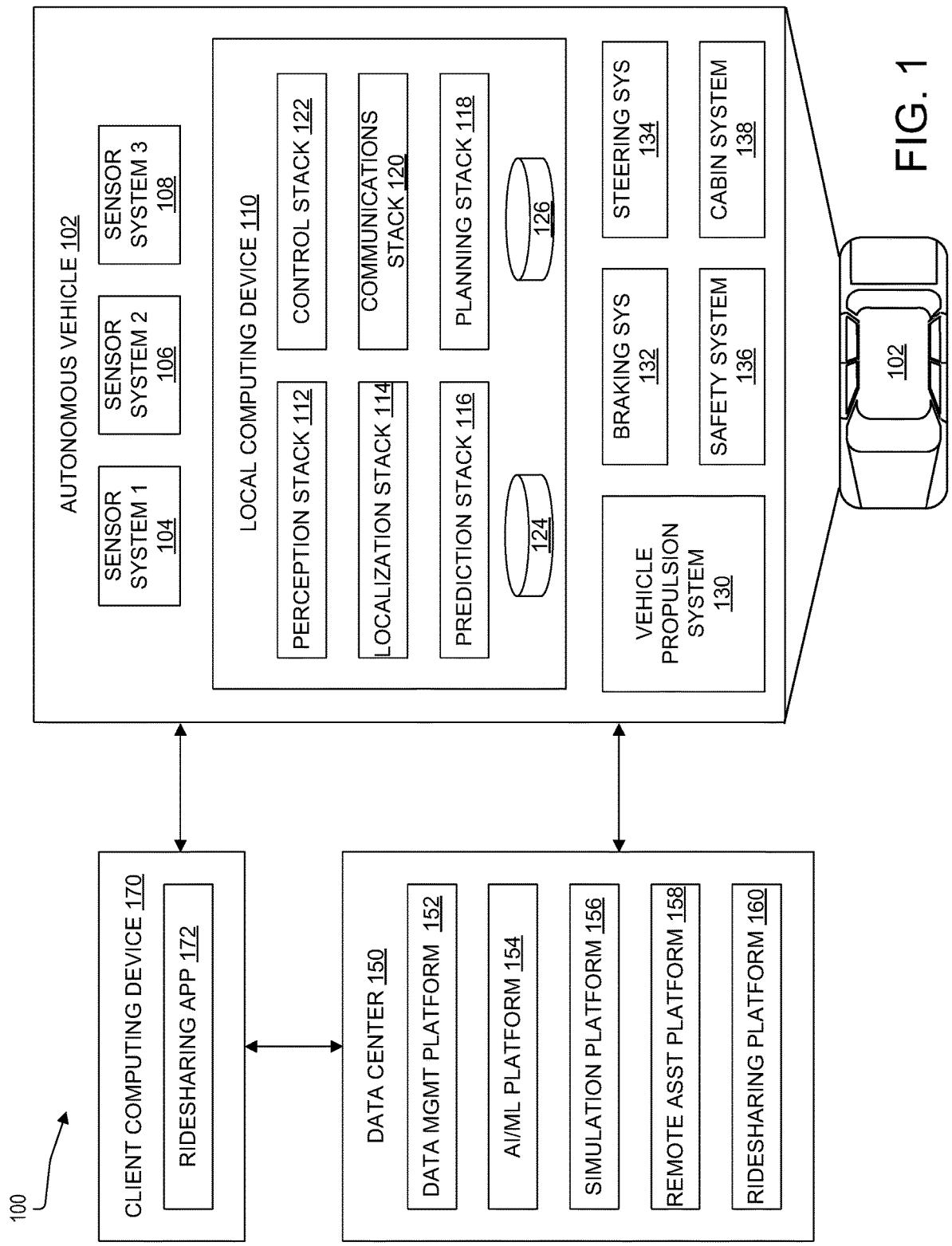
FIG. 1 illustrates an example of a system for managing one or more Autonomous Vehicles (AVs) in accordance with some aspects of the present technology.

Various examples of the present technology are discussed in detail below. While specific implementations are discussed, it should be understood that this is done for illustration purposes only. A person skilled in the relevant art will recognize that other components and configurations may be used without parting from the spirit and scope of the present technology. In some instances, well-known structures and devices are shown in block diagram form to facilitate describing one or more aspects. Further, it is to be understood that functionality described as being carried out by certain system components may be performed by more or fewer components than shown.

As described herein, one aspect of the present technology is gathering and using data from various sources to improve the ride quality and ride experience for a passenger in an autonomous vehicle. The present disclosure contemplates that in some instances, this gathered data may include personal information. The present disclosure contemplates that the entities involved with such personal information respect and value privacy policies and practices.

Common sensors used in autonomous vehicles, such as camera sensor systems, Light Detection and Ranging (LiDAR) sensors, radar sensors, or acoustic sensors, are susceptible to occlusion. These sensors are also susceptible to the environment, such as rainy or foggy weather. Autonomous vehicles can only react to objects that they perceive to be in their environment. As such, an occluded object that may become an obstacle to a planned trajectory might not be taken into account by the autonomous vehicles. Accordingly, the present technology can be used to at least make the autonomous vehicles aware that there might be an occluded object, and thereby, the autonomous vehicles can include a probability of the existence of the occluded object in planning a future trajectory for the autonomous vehicles.

Aspects of the disclosed technology provide solutions for detecting occluded objects. In some aspects, the disclosure provides inductive or capacitive sensors that use low-frequency electromagnetic waves to detect occluded objects. In some aspects, the disclosure provides antennas created from body parts of vehicles into antennas and can transmit electromagnetic signals and detect nearby metallic objects. Body parts of a vehicle, such as door frames, bumper, or hood chassis of the vehicle, can be constructed as inductive sensors or capacitive sensors that can transmit electromagnetic signals at low frequency, which can be used to detect occluded objects. In some aspects, the inductive sensors or capacitive sensors can be used in an array configuration.

The disclosure also provides a method for determining a location or orientation of an occluded object or anomalous object by an autonomous vehicle (AV). The method may determine the location or orientation of the occluded object or anomalous object in combination with data from direct-object-detecting sensors (e.g., camera sensors, LIDAR sensors, and RADAR sensors) in combination with one or more machine learning models to reason about the likely location of the occluded object.

FIG. 1 illustrates an example of an AV management system 100. One of the ordinary skills in the art will understand that there can be additional or fewer components in similar or alternative configurations for the AV management system 100 and any system discussed in the present disclosure. The illustrations and examples provided in the present disclosure are for conciseness and clarity. Other embodiments may include different numbers and/or types of elements, but one of the ordinary skills in the art will appreciate that such variations do not depart from the scope of the present disclosure.

In this example, the AV management system 100 includes an AV 102, a data center 150, and a client computing device 170. The AV 102, the data center 150, and the client computing device 170 can communicate with one another over one or more networks (not shown), such as a public network (e.g., the Internet, an Infrastructure as a Service (IaaS) network, a Platform as a Service (PaaS) network, a Software as a Service (SaaS) network, other Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

The AV 102 can navigate roadways without a human driver based on sensor signals generated by multiple sensor systems 104, 106, and 108. The sensor systems 104-108 can include different types of sensors and can be arranged about the AV 102. For instance, the sensor systems 104-108 can comprise Inertial Measurement Units (IMUs), cameras (e.g., still image cameras, video cameras, etc.), light sensors (e.g., LIDAR systems, ambient light sensors, infrared sensors, etc.), RADAR systems, GPS receivers, audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, sensor system 104 can be a camera system, sensor system 106 can be a LIDAR system, and sensor system 108 can be a RADAR system. Other embodiments may include any other number and type of sensors.

The AV 102 can also include several mechanical systems that can be used to maneuver or operate the AV 102. For instance, the mechanical systems can include a vehicle propulsion system 130, a braking system 132, a steering system 134, a safety system 136, and a cabin system 138, among other systems. The vehicle propulsion system 130 can include an electric motor, an internal combustion engine, or both. The braking system 132 can include an engine brake, brake pads, actuators, and/or any other suitable componentry configured to assist in decelerating the AV 102. The steering system 134 can include suitable componentry configured to control the direction of movement of the AV 102 during navigation. The safety system 136 can include lights and signal indicators, a parking brake, airbags, and so forth. The cabin system 138 can include cabin temperature control systems, in-cabin entertainment systems, and so forth. In some embodiments, the AV 102 might not include human driver actuators (e.g., steering wheel, handbrake, foot brake pedal, foot accelerator pedal, turn signal lever, window wipers, etc.) for controlling the AV 102. Instead, the cabin system 138 can include one or more client interfaces (e.g., Graphical User Interfaces (GUIs), Voice User Interfaces (VUIs), etc.) for controlling certain aspects of the mechanical systems 130-138.

The AV 102 can additionally include a local computing device 110 that is in communication with the sensor systems 104-108, the mechanical systems 130-138, the data center 150, and the client computing device 170, among other systems. The local computing device 110 can include one or more processors and memory, including instructions that can be executed by the one or more processors. The instructions can make up one or more software stacks or components responsible for controlling the AV 102; communicating with the data center 150, the client computing device 170, and other systems; receiving inputs from riders, passengers, and other entities within the AV's environment; logging metrics collected by the sensor systems 104-108; and so forth. In this example, the local computing device 110 includes a perception stack 112, a localization stack 114, a prediction stack 116, a planning stack 118, a communications stack 120, a control stack 122, an AV operational database 124, and an HD geospatial database 126, among other stacks and systems.

The perception stack 112 can enable the AV 102 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 104-108, the mapping and localization stack 114, the HD geospatial database 126, other components of the AV, and other data sources (e.g., the data center 150, the client computing device 170, third party data sources, etc.). The perception stack 112 can detect and classify objects and determine their current locations, speeds, directions, and the like. In addition, the perception stack 112 can determine the free space around the AV 102 (e.g., to maintain a safe distance from other objects, change lanes, park the AV, etc.). The perception stack 112 can also identify environmental uncertainties, such as where to look for moving objects, flag areas that may be obscured or blocked from view, and so forth. In some embodiments, an output of the prediction stack can be a bounding area around a perceived object that can be associated with a semantic label that identifies the type of object that is within the bounding area, the kinematic of the object (information about its movement), a tracked path of the object, and a description of the pose of the object (its orientation or heading, etc.). The bounding area may by defined on grid that includes a rectangular, cylindrical or spherical projection of the camera or LIDAR data.

The mapping and localization stack 114 can determine the AV's position and orientation (pose) using different methods from multiple systems (e.g., GPS, IMUs, cameras, LIDAR, RADAR, ultrasonic sensors, the HD geospatial database 126, etc.). For example, in some embodiments, the AV 102 can compare sensor data captured in real-time by the sensor systems 104-108 to data in the HD geospatial database 126 to determine its precise (e.g., accurate to the order of a few centimeters or less) position and orientation. The AV 102 can focus its search based on sensor data from one or more first sensor systems (e.g., GPS) by matching sensor data from one or more second sensor systems (e.g., LIDAR). If the mapping and localization information from one system is unavailable, the AV 102 can use mapping and localization information from a redundant system and/or from remote data sources.

The prediction stack 116 can receive information from the localization stack 114 and objects identified by the perception stack 112 and predict a future path for the objects. In some embodiments, the prediction stack 116 can output several likely paths that an object is predicted to take along with a probability associated with each path. For each predicted path, the prediction stack 116 can also output a range of points along with the path corresponding to a predicted location of the object along the path at future time intervals along with an expected error value for each of the points that indicates a probabilistic deviation from that point. In some embodiments, the prediction stack 116 can output a probability distribution of likely paths or positions that the object is predicted to take.

The planning stack 118 can determine how to maneuver or operate the AV 102 safely and efficiently in its environment. For example, the planning stack 118 can receive the location, speed, and direction of the AV 102, geospatial data, data regarding objects sharing the road with the AV 102 (e.g., pedestrians, bicycles, vehicles, ambulances, buses, cable cars, trains, traffic lights, lanes, road markings, etc.) or certain events occurring during a trip (e.g., emergency vehicle blaring a siren, intersections, occluded areas, street closures for construction or street repairs, double-parked cars, etc.), traffic rules and other safety standards or practices for the road, user input, and other relevant data for directing the AV 102 from one point to another and outputs from the perception stack 112, localization stack 114, and prediction stack 116. The planning stack 118 can determine multiple sets of one or more mechanical operations that the AV 102 can perform (e.g., go straight at a specified rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 118 can select from multiple backup plans to carry out. For example, while preparing to change lanes to turn right at an intersection, another vehicle may aggressively cut into the destination lane, making the lane change unsafe. The planning stack 118 could have already determined an alternative plan for such an event. Upon its occurrence, it could help direct the AV 102 to go around the block instead of blocking a current lane while waiting for an opening to change lanes.

The control stack 122 can manage the operation of the vehicle propulsion system 130, the braking system 132, the steering system 134, the safety system 136, and the cabin system 138. The control stack 122 can receive sensor signals from the sensor systems 104-108 as well as communicate with other stacks or components of the local computing device 110 or a remote system (e.g., the data center 150) to effectuate operation of the AV 102. For example, the control stack 122 can implement the final path or actions from the multiple paths or actions provided by the planning stack 118. This can involve turning the routes and decisions from the planning stack 118 into commands for the actuators that control the AV's steering, throttle, brake, and drive unit.

The communications stack 120 can transmit and receive signals between the various stacks and other components of the AV 102 and between the AV 102, the data center 150, the client computing device 170, and other remote systems. The communications stack 120 can enable the local computing device 110 to exchange information remotely over a network, such as through an antenna array or interface that can provide a metropolitan WIFI network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communications stack 120 can also facilitate the local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth®, infrared, etc.).

The HD geospatial database 126 can store HD maps and related data of the streets upon which the AV 102 travels. In some embodiments, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane centerline, lane boundaries, type of lane boundaries, etc.) and related attributes (e.g., the direction of travel, speed limit, lane type, etc.). The lanes and boundaries layer can also include 3D attributes related to lanes (e.g., slope, elevation, curvature, etc.). The intersections layer can include geospatial information of intersections (e.g., crosswalks, stop lines, turning lane centerlines and/or boundaries, etc.) and related attributes (e.g., permissive, protected/permissive, or protected only left-turn lanes; legal or illegal u-turn lanes; permissive or protected only right turn lanes; etc.). The traffic controls lane can include geospatial information of traffic signal lights, traffic signs, and other road objects and related attributes.

The AV operational database 124 can store raw AV data generated by the sensor systems 104-108, stacks 112-122, and other components of the AV 102 and/or data received by the AV 102 from remote systems (e.g., the data center 150, the client computing device 170, etc.). In some embodiments, the raw AV data can include HD LIDAR point cloud data, image data, RADAR data, GPS data, and other sensor data that the data center 150 can use for creating or updating AV geospatial data or for creating simulations of situations encountered by AV 102 for future testing or training of various machine-learning algorithms that are incorporated in the local computing device 110.

The data center 150 can be a private cloud (e.g., an enterprise network, a co-location provider network, etc.), a public cloud (e.g., an Infrastructure as a Service (IaaS) network, a Platform as a Service (PaaS) network, a Software as a Service (SaaS) network, or other Cloud Service Provider (CSP) network), a hybrid cloud, a multi-cloud, and so forth. The data center 150 can include one or more computing devices remote to the local computing device 110 for managing a fleet of AVs and AV-related services. For example, in addition to managing the AV 102, the data center 150 may also support a ridesharing service, a delivery service, a remote/roadside assistance service, street services (e.g., street mapping, street patrol, street cleaning, street metering, parking reservation, etc.), and the like.

The data center 150 can send and receive various signals to and from the AV 102 and the client computing device 170. These signals can include sensor data captured by the sensor systems 104-108, roadside assistance requests, software updates, ridesharing pick-up and drop-off instructions, and so forth. In this example, the data center 150 includes a data management platform 152, an Artificial Intelligence/Machine-learning (AI/ML) platform 154, a simulation platform 156, remote assistance platform 158, and a ridesharing platform 160, among other systems.

The data management platform 152 can be a "big data" system capable of receiving and transmitting data at high velocities (e.g., near real-time or real-time), processing a large variety of data and storing large volumes of data (e.g., terabytes, petabytes, or more of data). The varieties of data can include data having differently structured (e.g., structured, semi-structured, unstructured, etc.), data of different types (e.g., sensor data, mechanical system data, ridesharing service, map data, audio, video, etc.), data associated with different types of data stores (e.g., relational databases, key-value stores, document databases, graph databases, column-family databases, data analytic stores, search engine databases, time-series databases, object stores, file systems, etc.), data originating from different sources (e.g., AVs, enterprise systems, social networks, etc.), data having different rates of change (e.g., batch, streaming, etc.), or data having other heterogeneous characteristics. The various platforms and systems of the data center 150 can access data stored by the data management platform 152 to provide their respective services.

The AI/ML platform 154 can provide the infrastructure for training and evaluating machine-learning algorithms for operating the AV 102, the simulation platform 156, the remote assistance platform 158, the ridesharing platform 160, and other platforms and systems. Using the AI/ML platform 154, data scientists can prepare data sets from the data management platform 152; select, design, and train machine-learning models; evaluate, refine, and deploy the models; maintain, monitor, and retrain the models; and so on.

The simulation platform 156 can enable testing and validation of the algorithms, machine-learning models, neural networks, and other development efforts for the AV 102, the remote assistance platform 158, the ridesharing platform 160, and other platforms and systems. The simulation platform 156 can replicate a variety of driving environments and/or reproduce real-world scenarios from data captured by the AV 102, including rendering geospatial information and road infrastructure (e.g., streets, lanes, crosswalks, traffic lights, stop signs, etc.) obtained from a cartography platform; modeling the behavior of other vehicles, bicycles, pedestrians, and other dynamic elements; simulating inclement weather conditions, different traffic scenarios; and so on.

The remote assistance platform 158 can generate and transmit instructions regarding the operation of the AV 102. For example, in response to an output of the AI/ML platform 154 or other systems of the data center 150, the remote assistance platform 158 can prepare instructions for one or more stacks or other components of the AV 102.

The ridesharing platform 160 can interact with a customer of a ridesharing service via a ridesharing application 172 executing on the client computing device 170. The client computing device 170 can be any type of computing system, including a server, desktop computer, laptop, tablet, smartphone, smart wearable device (e.g., smartwatch, smart eyeglasses or other Head-Mounted Display (HMD), smart ear pods, or other smart in-ear, on-ear, or over-ear device, etc.), gaming system, or other general-purpose computing devices for accessing the ridesharing application 172. The client computing device 170 can be a customer's mobile computing device or a computing device integrated with the AV 102 (e.g., the local computing device 110). The ridesharing platform 160 can receive requests to pick up or drop off from the ridesharing application 172 and dispatch the AV 102 for the trip.

Figure 2:
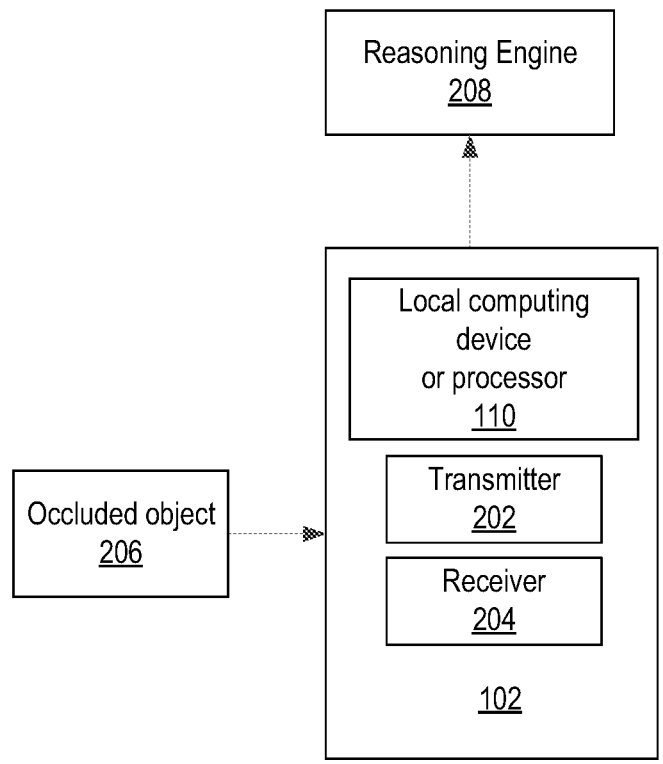
FIG. 2 is a diagram illustrating a sensor system of a vehicle including transmitters and receivers constructed of body parts of the vehicle in accordance with some aspects of the present technology.

FIG. 2 is a diagram illustrating a sensor system of a vehicle including transmitters and receivers constructed of body parts of the vehicle in accordance with some aspects of the present technology. For example, one portion of the body part can be constructed as a first antenna or transmitter 202 to be configured to transmit electromagnetic signals, and another portion of the body part can be constructed as a second antenna or receiver 204 configured to receive electromagnetic signals. The transmitter 202 or the receiver 204 can also be a single-turn or multi-turn wire that is wound around the body part that is electrically insulated from other body parts.

As illustrated in FIG. 2, a sensor system 200 may include transmitter 202 on vehicle 102 configured to transmit an electromagnetic signal resulting in a primary electromagnetic field at a low frequency (e.g., 1 Hz to 1 kHz). The sensor system 200 may also include receiver 204 on vehicle 102 configured to detect a secondary electromagnetic signal caused by an occluded object 206 (e.g., a second vehicle) surrounding vehicle 102 reacting to the primary electromagnetic field created by the transmitter 202 on the vehicle. In some embodiments, the secondary electromagnetic field can be perceived as a disturbance to the primary electromagnetic field.

It will be appreciated by those skilled in the art that the transmitter may be an array of transmitters and the receiver may also be an array of receivers. A first portion of the body part of the vehicle can be constructed as a first antenna to be configured to transmit electromagnetic signals, and a second portion of the body part of the vehicle can be constructed as a second antenna configured to transmit electromagnetic signals. A third portion of the body part can be constructed as a third antenna to be configured to receive secondary electromagnetic signals, and a fourth portion of the body part can be a second antenna configured to receive secondary electromagnetic signals.

The local computing device 110 or processor on the vehicle is configured to determine that the magnitude of the secondary electromagnetic field is above a threshold, thereby inferring that an anomaly is present that is causing the secondary electromagnetic field. Often the anomaly can be occluded object 206.

The local computing device 110 or processor is configured to process the secondary electromagnetic signals. The processor is also configured to receive the secondary electromagnetic signals or electric signals from receiver 204 on the vehicle. The processor may also compare the electric signals with a threshold for the secondary electromagnetic signal to identify that an anomaly is present. The processor may also process the electrical signal to determine the location or orientation of the anomaly.

In some variations, the processor may utilize an inversion problem-solving method to process the electromagnetic signals in combination with data received from other sensors (e.g., cameras, LiDAR sensors, or radar sensors). The inverse problem-solving method starts with effects (e.g., secondary electromagnetic signals received by the receivers) and then figures out the causes (e.g., metallic objects that cause the secondary electromagnetic signals).

The processor 110 may also communicate with a reasoning engine 208 and initiate the reasoning engine 208 to determine a probable location for occluded object 206. In some variations, the reasoning engine 208 is an algorithm trained by a machine learning model on the AI/ML platform 156.

In some variations, receiver 204 is a separate component from transmitter 202. The receiver may simultaneously measure secondary electromagnetic signals while the transmitter induces electromagnetic signals. The receiver may receive the electromagnetic signals containing mostly amplitude information at low frequency, less phase information at low frequency. The low-frequency signals are different from radio frequency (RF) frequency electromagnetic signals, which include both amplitude and phase information.

The inductive or capacitive sensors function as antennas for transmitting or receiving electromagnetic signals at low frequencies and allow for detections of occluded objects by penetrating through other objects, such as walls, heavy trucks, or large transporting vehicles.

The inductive or capacitive sensors function as antennas for measuring or receiving low-frequency electromagnetic signals and can detect anomalous objects or metallic objects, such as other vehicles that are occluded or not detectable by direct-object-detecting sensors, such as cameras, LiDAR sensors, or radar sensors, among others. By detecting the secondary electromagnetic fields or signals using a receiver or an array of receivers containing antennas positioned at different locations on the vehicle, the processor can determine the locations or orientation of the anomalous objects.

The inductive or capacitive sensors function as antennas for transmitting and receiving electromagnetic signals at low frequency and also have benefits over direct-object-detecting sensors (e.g., cameras or LiDAR sensors or radars) in certain environments, such as a rainy environment or a foggy environment since the electromagnetic field is not affected by weather as much as light.

Figure 3:
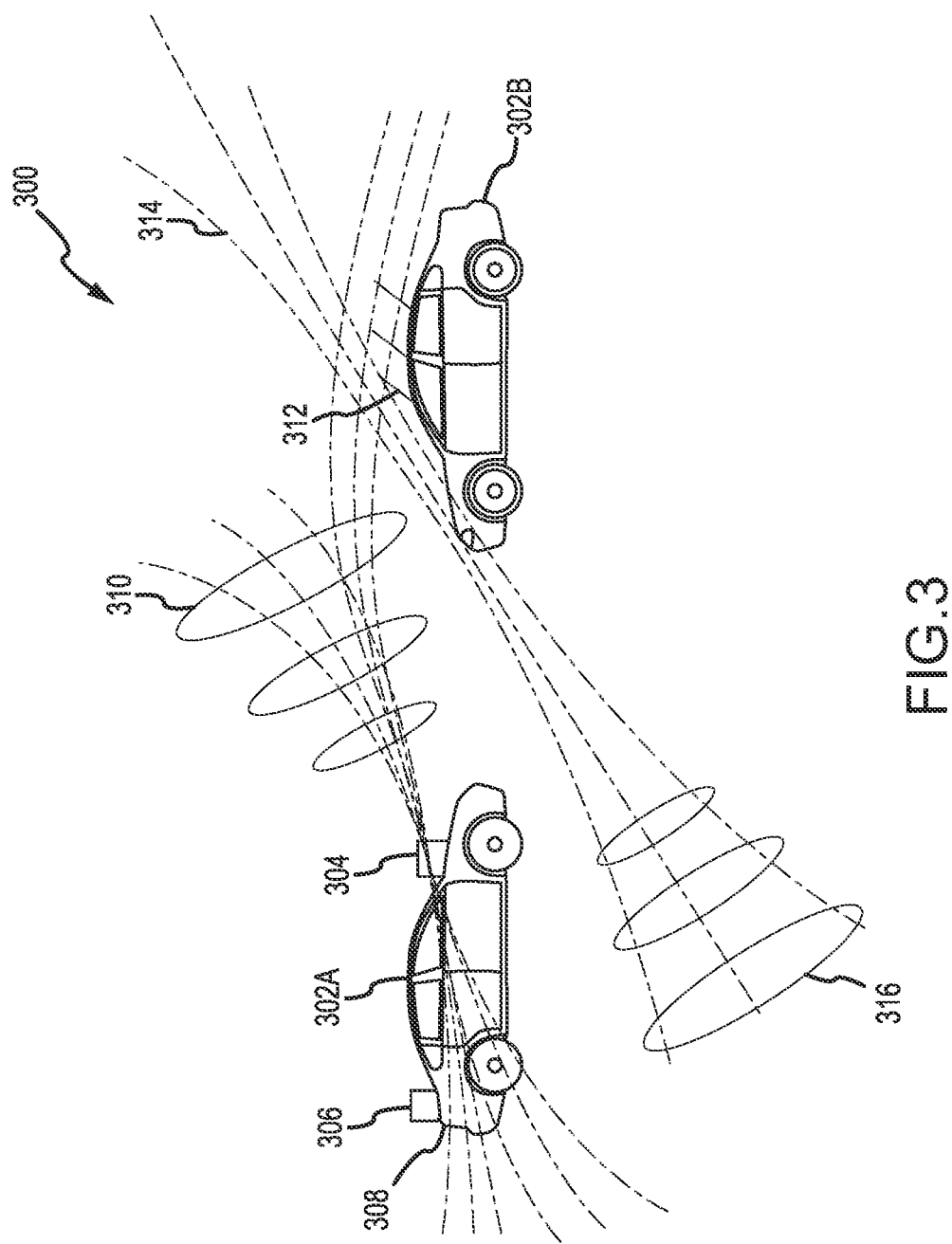
FIG. 3 illustrates an electromagnetic field from a transmitter on a first vehicle interacting with a metallic object or a second vehicle in accordance with some aspects of the present technology.

FIG. 3 illustrates an electromagnetic field from a transmitter on a first vehicle interacting with a metallic object or a second vehicle in accordance with some aspects of the present technology. A transmitter 304 on a first vehicle 302A generates a varying magnetic field by applying an alternating current (AC) as illustrated by magnetic field lines 308. The varying magnetic field generates a varying electric field, as illustrated by loops 310. The varying electric field 310 further generates a varying magnetic field such that the electromagnetic field travels.

When the transmitter 304 operates at a low frequency (e.g., 1 Hz to 1 kHz), the varying magnetic field is a quasi-magnetic field, i.e., a large or strong magnetic field, and a small or weak electric field. The quasi-magnetic field is a class of electromagnetic fields in which a slowly oscillating magnetic field is dominant. The magnetic field is generated by low-frequency induction from the inductive sensor, which uses AC to induce a varying magnetic field. At low frequencies, the rate of change of the instantaneous field strength with each cycle is relatively slow. The quasi-magnetic field may extend to a region no more than a wavelength from the inductive sensor or antenna, and within the region the electric and magnetic fields are approximately decoupled.

When the electromagnetic field encounters a second vehicle 302B (e.g., metallic object), the varying magnetic field portion of the electromagnetic field at low frequency can pass through the second vehicle 302B, but the electric field portion of the electromagnetic field interacts with the second vehicle 302B (e.g., metallic object) and disturbs the electromagnetic field to generate an electric field 312, which generates a varying secondary magnetic field as illustrated in field lines 314, which generates a varying secondary electric field as illustrated in loops 316. The varying secondary electric field is detected or sensed by a receiver 306 on the first vehicle 302A.

In some variations, the electromagnetic field can penetrate or pass through any non-metallic object and is undisturbed by the non-metallic object. As such, occluded objects, such as metallic objects or vehicles, can be detected using the inductive sensor or capacitive sensor to sense the disturbance in the electric field caused by the metallic objects.

In some variations, the quasi-magnetic field can penetrate non-magnetic objects or non-metallic objects to detect occluded objects, such as metallic objects or vehicles.

In some variations, weakly conducting non-magnetic bodies, such as mineral rocks, and walls, are effectively transparent to the magnetic fields, allowing for transmitting and receiving signals through such obstacles.

In some variations, a vehicle may be a metallic object. For example, the outer body of the vehicle is formed of metal and applied with metallic paints. The metallic paints contain aluminum flakes, which create a sparkling and grainy effect, generally referred to as a metallic look. Although most outer body parts of the vehicle are metal, such as steel, the outer body parts have paint applied for both protection and decoration purposes. The paint may be water-based acrylic polyurethane enamel paint. The paint may be solid paints with no sparkle effects except the color. Solid paint is the easiest type to apply and the most common type of paint for heavy vehicles, construction equipment, and aircraft. It is also widely used on cars, trucks, and motorcycles. When the vehicles have solid paints, the paints on the vehicles are considered as non-metallic objects. Electric fields 310 can still effectively pass through the non-metallic paint and cause secondary electric fields 316, hence the operation of system of transmitter 202 and receiver 204 is independent of the type of paint of the vehicle.

In some variations, bodies of humans or animals contain significant amount of water and can impede the flow of electricity. As a result, even though humans or animals are not metallic, they can still create large signals that can be received by the receiver 204.

Figure 4A:
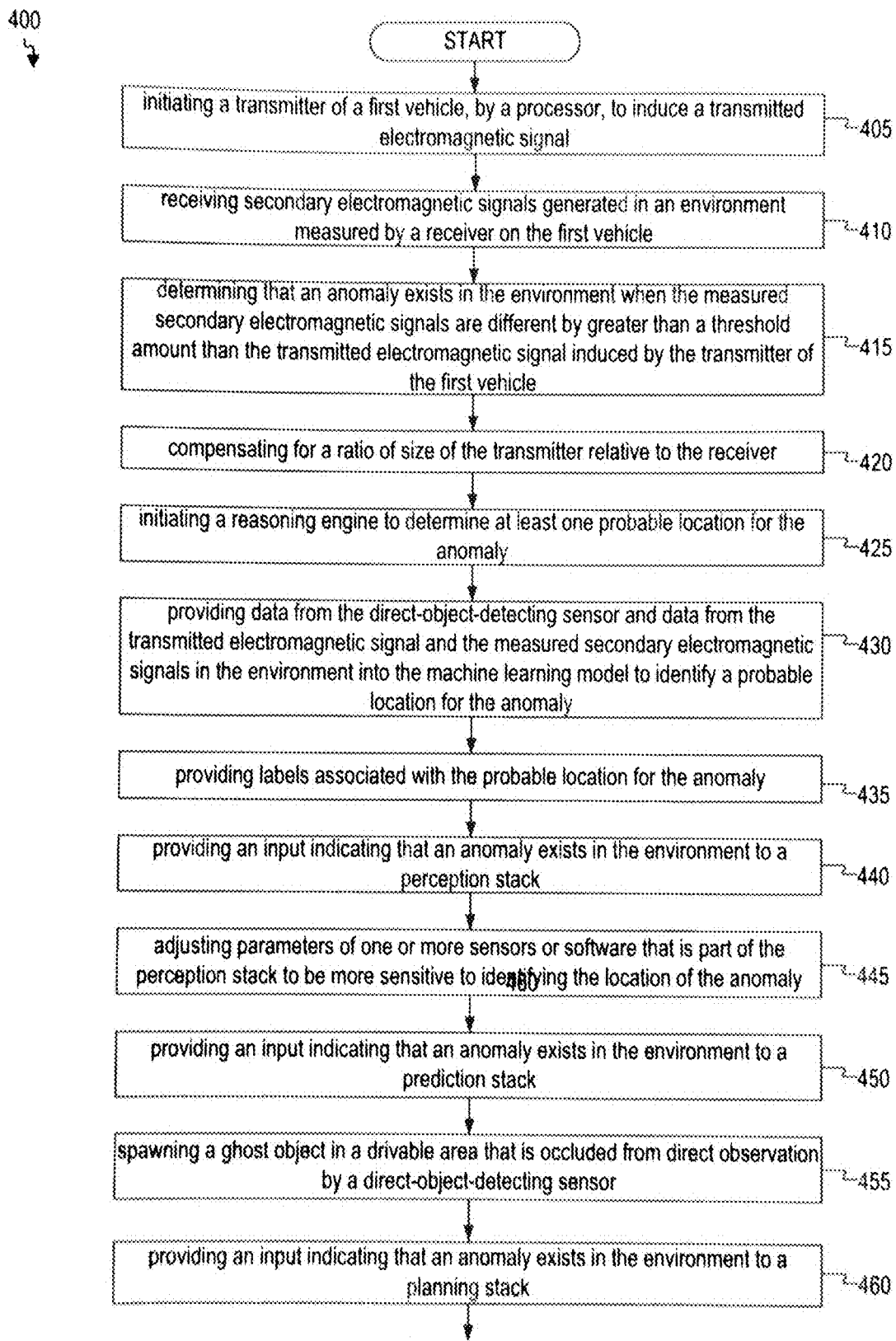
FIGS. 4A and 4B illustrate an example method 400 for using an electromagnetic signal to detect an occluded object in accordance with some aspects of the present technology.
Figure 4B:
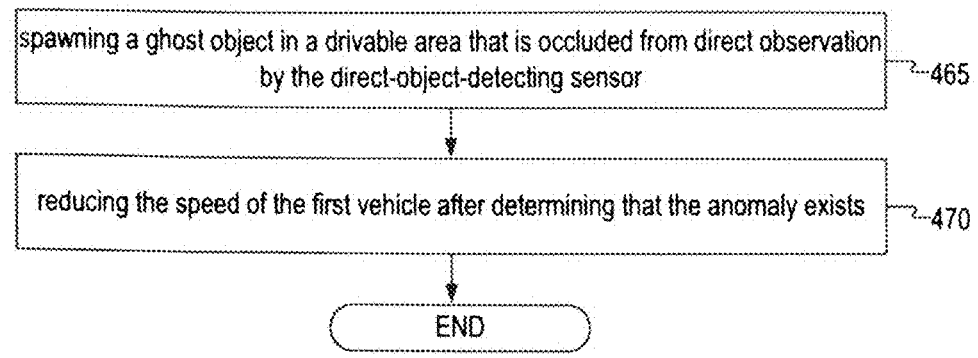

FIGS. 4A and 4B illustrate an example method 400 for using an electromagnetic signal to detect an occluded object in accordance with some aspects of the present technology. Although example method 400 depicts a particular sequence of operations, the sequence may be altered without departing from the scope of the present disclosure. For example, some of the operations depicted may be performed in parallel or in a different sequence that does not materially affect the function of method 400. In other examples, different components of an example device or system that implements method 400 may perform functions at substantially the same time or in a specific sequence.

According to some examples, method 400 may include initiating a transmitter of the first vehicle to induce a transmitted electromagnetic signal at block 405. For example, the local computing device 110, which includes a processor, as illustrated in FIG. 1 may initiate a transmitter 202 of the first vehicle to induce a transmitted electromagnetic signal. The initiating may use an alternating current (AC) from a current source, generating varying magnetic fields from the transmitter. The varying magnetic fields can generate varying electric fields. The frequency of the AC current may be between 0.1 Hz and 1 GHz. The initiating may also use an electromagnetic pulse. As an example, an electromagnetic pulse with an envelope of Gaussian shape and a central frequency between 1 Hz and 100 MHz may be used. Low frequencies 0.1 Hz to 10 kHz can easily pass through non-metallic objects, so they are ideal for detecting occlusions. Higher frequencies 10 kHz-1 GHz are affected by occlusion more, so they can be used to detect objects that are no occluded.

In some variations, the transmitter may include an outer body portion of the vehicle. The outer body portion is electrically isolated from other outer portions of the vehicle.

In some variations, the transmitter is an inductive sensor or a capacitive sensor.

According to some examples, method 400 may include receiving secondary electromagnetic signals generated in an environment measured by a receiver on the first vehicle at block 410. For example, the local computing device 110 or processor, as illustrated in FIG. 1 may receive secondary electromagnetic signals in an environment measured by receiver 204 on the first vehicle. The secondary electromagnetic signals are generated by the transmitted electromagnetic signal interacting with metallic objects in the environment.

In some variations, the receiver may include an outer body portion of the vehicle. The outer body portion is electrically isolated from other outer portions of the vehicle.

In some variations, the receiver is an inductive sensor or a capacitive sensor.

The secondary electromagnetic signals are utilized in combination with data from cameras, LIDAR sensors, and RADAR sensors on the first vehicle to identify anomalous objects for the AV.

The outer body portion of the vehicle may include one or more of door frames, vehicle bumper, or vehicle hood.

According to some examples, method 400 may include determining that an anomaly exists in the environment when the measured secondary electromagnetic signals are different by greater than a threshold amount than the transmitted electromagnetic signal induced by the transmitter of the first vehicle at block 415. For example, the local computing device 110 or processor as illustrated in FIG. 1 may determine that an anomaly exists in the environment when the measured secondary electromagnetic signals are different by greater than a threshold amount than the transmitted electromagnetic signal induced by the transmitter of the first vehicle.

In some variations, the anomaly is a vehicle occluded from the perception of at least one direct-object-detecting sensor. In some variations, the anomaly is a pedestrian or animal occluded from the perception of at least one direct-object-detecting sensor.

In some variations, the first vehicle is equipped with at least one direct-object-detecting sensor. The at least one direct object detecting sensor may be a LiDAR, RADAR, or camera.

In some variations, the threshold is dynamically adjusted based on a preceding measurement. In this case, the sensors on the vehicle 102, such as cameras or LIDAR, are used to detect an object which may have been occluded in previous frames. Similarly, the sensors on the vehicle 102, such as cameras or LIDAR, are used to detect scenarios where there are no objects. Finally, the threshold is selected to a value that can optimally separate the measurements with and without occlusions. As an example, the threshold can be selected to the half-way point between averages of measurements with occluded objects and no objects: $T=(M1+M2)/2$, where M1 is the average of measurements with occluded objects, and M2 is the average of measurements without objects.

According to some examples, method 400 may include compensating for a ratio of the size of the transmitter relative to the receiver at block 420. For example, the local computing device 110 or processor as illustrated in FIG. 1 may compensate for a ratio of the size of the transmitter relative to the receiver. As an example, T1, T2, R1, and R2 denote transmitter 1, transmitter 2, receiver 1, and receiver 2, respectively, and TXRY denotes the signal received at receiver Y when transmitter X is transmitting. A measurement ratio of T1R1/T1R2 may be used to compensate for the effect of size or magnitude of T1. Similarly, a measurement ratio of T1R1/T2R1 may be used to compensate for the effect of size of sensitivity of R1. Similarly, a measurement ratio of T1R1*T2R2/T1R2/T2R1 may be used to compensate for the effect of size, magnitude, or sensitivity of all T1, T2, R1, and R2.

According to some examples, method 400 may include initiating a reasoning engine to determine at least one probable location for the anomaly at block 425. For example, the local computing device 110 or processor as illustrated in FIGS. 1 and 2 may initiate a reasoning engine 208 as illustrated in FIG. 2 to determine at least one probable location for the anomaly.

Since the inductive or capacitive sensing technologies utilized herein are associated with a limited ability to determine a precise location of a detected anomaly in a road environment, the present technology combines the indication that an anomaly is present with a reasoning engine to predict a probable location of the anomaly. Given that other sensors on the vehicle can directly detect or perceive unobstructed objects in the road environment, the computing system of the autonomous vehicle already has rich data from which to predict a location of an obstructed anomaly.

For example, if the direct-object-detecting sensors perceive a single-lane road environment wherein objects within a range of capacitive or inductive sensing are all directly observed, but there is a nearby driveway with an obstructed entrance within the sensing range, a machine reasoning engine or machine learning model could predict that an object might be located in the driveway.

In another example, if the direct-object-detecting sensors perceive a large vehicle obstructing a portion of the road environment that is within range of the capacitive or inductive sensing, the machine reasoning engine or machine learning model predict that an object might be hidden behind the large vehicle.

While the machine reasoning engine or machine learning model might not have information about the type of object causing the anomaly, the autonomous vehicle may assume that it is a vehicle. Assuming that a vehicle exists can be safer than predicting a stationary object since the prediction and planning stacks of the autonomous vehicle can then account for the possibility that the vehicle will progress from its current location.

In some variations, the reasoning engine 208 is an algorithm trained by a machine learning model.

According to some examples, method 400 may include providing data from the direct-object-detecting sensor and data from the transmitted electromagnetic signal and the measured secondary electromagnetic signals in the environment into the machine learning model to identify a probable location for the anomaly at block 430. For example, the local computing device 110 or processor as illustrated in FIG. 1 may provide data from the direct-object-detecting sensor (e.g., LiDAR sensor, camera sensor, or radar sensor systems 104-108) and data from the transmitted electromagnetic signal and the measured secondary electromagnetic signals in the environment into the machine learning model on AI/ML platform 154 to identify a probable location for the anomaly.

According to some examples, method 400 may include providing labels associated with the probable location for the anomaly at block 435. For example, the local computing device 110 or processor as illustrated in FIG. 1 may provide labels associated with the probable location for the anomaly.

In some variations, the labels that indicate the location of the anomaly were derived from a time series of a combination of the direct-object-detecting sensor and data from the transmitted electromagnetic signal and the measured secondary electromagnetic signals in the environment. The dataset includes instances where the data from the transmitted electromagnetic signal and the measured secondary electromagnetic signals in the environment indicate the presence of an anomaly, and later the direct-object-detecting sensor (e.g., LiDAR sensor, camera sensor, or radar sensor systems 104-108) observed the cause of the anomaly.

According to some examples, method 400 may include providing an input indicating that an anomaly exists in the environment to a perception stack at block 440. For example, the local computing device 110 or processor as illustrated in FIG. 1 may provide an input indicating that an anomaly exists in the environment to the perception stack 112.

According to some examples, method 400 may include adjusting parameters of one or more sensors or software that is part of the perception stack to be more sensitive to identifying a location of the anomaly at block 445. For example, the local computing device 110 or processor, as illustrated in FIG. 1 may adjust parameters of one or more sensors or software that is part of the perception stack 112 as illustrated in FIG. 1 to be more sensitive to identify a location of the anomaly.

According to some examples, method 400 may include providing an input indicating that an anomaly exists in the environment to a prediction stack at block 450. For example, the local computing device 110 or processor as illustrated in FIG. 1 may provide an input indicating that an anomaly exists in the environment to the prediction stack 116 as illustrated in FIG. 1.

According to some examples, method 400 may include spawning a ghost object in a drivable area that is occluded from direct observation by a direct-object-detecting sensor at block 455. For example, the local computing device 110 or processor as illustrated in FIG. 1 may spawn a ghost object in a drivable area that is occluded from direct observation by a direct-object-detecting sensor, whereby the prediction stack 116 as illustrated in FIG. 1 and downstream consumers of data from the prediction stack 116 can account for the possibility of the existence of the ghost object.

According to some examples, method 400 may include providing an input indicating that an anomaly exists in the environment to a planning stack at block 460. For example, the local computing device 110 or processor as illustrated in FIG. 1 may provide an input indicating that an anomaly exists in the environment to the planning stack 118 as illustrated in FIG. 1.

According to some examples, method 400 may include spawning a ghost object in a drivable area that is occluded from direct observation by the direct-object-detecting sensor at block 465. For example, the local computing device 110 or processor as illustrated in FIG. 1 may spawn a ghost object in a drivable area that is occluded from direct observation by the direct-object-detecting sensor, whereby the planning stack 118 and downstream consumers of data from the planning stack 118 can account for the possibility of the existence of the ghost object.

According to some examples, method 400 may include inferring that a second vehicle is near the first vehicle. For example, the local computing device 110 or processor as illustrated in FIG. 1 may infer that a second vehicle is near the first vehicle.

According to some examples, method 400 may include reducing the speed of the first vehicle after determining that the anomaly exists at block 470. For example, the local computing device 110 or processor as illustrated in FIG. 1 may reduce the speed of the first vehicle after determining that the anomaly exists.

EXAMPLES

The following examples are for illustration purposes only. It will be apparent to those skilled in the art that many modifications, both to materials and methods, may be practiced without departing from the scope of the disclosure.

A few examples are provided below to illustrate constructions of body parts of a vehicle as inductive sensors and capacitive sensors. For example, a door frame of a vehicle can be constructed as an inductive sensor. Also, a bumper of the vehicle can be constructed as an inductive sensor. A hood of the vehicle can be constructed as a capacitive sensor. The inductive sensors or capacitive sensors may operate in a low frequency ranging from 0.1 Hz to 10 kHz for detection of occlusions. The inductive sensors or capacitive sensors may operate in a higher frequency ranging from 10 kHz to 1 GHz for detection of non-occluded objects.

The inductive sensors or capacitive sensors can be used as a transmitter, which may be configured to generate a quasi-magnetic field at the low frequency, which includes a large magnetic field and a small electric field.

In some variations, the transmitter induces the electromagnetic signal by generating a continuous waveform. In some variations, the transmitter induces the electromagnetic signal by generating a pulse.

In some variations, the transmitter includes an electrically isolated portion of a body portion of a vehicle. In some variations, the transmitter induces the electromagnetic signal by a first of the more than one electrically isolated portion of a body portion of the vehicle. In some variations, the receiver measures the secondary electromagnetic signals in the environment by a second electrically isolated portion of a body portion of the vehicle.

In some variations, the transmitter is more than one electrically isolated portion of a body portion of a vehicle. In some variations, the transmitter induces the electromagnetic signal by a first of the more than one electrically isolated portion of a body portion of the vehicle and then induces the electromagnetic signal by a second of the more than one electrically isolated portion of a body portion of the first vehicle. In some variations, the receiver measures the secondary electromagnetic signals in the environment by a third electrically isolated portion of a body portion of the vehicle and then measures the secondary electromagnetic signals in the environment by a fourth electrically isolated portion of a body portion of the vehicle.

In some variations, the transmitted electromagnetic signal has a frequency between 0.1 Hz and 1 GHz.

The inductive sensors or capacitive sensors can also be used as a receiver, which may be configured to receive the secondary electric signal from the small electric field.

In some variations, the receiver measures the secondary electromagnetic signals in the environment by measuring a change in capacitance.

In some variations, the receiver measures the secondary electromagnetic signals in the environment by measuring a change in inductance.

Constructing Vehicle Body as Inductive Sensors

Figure 5:
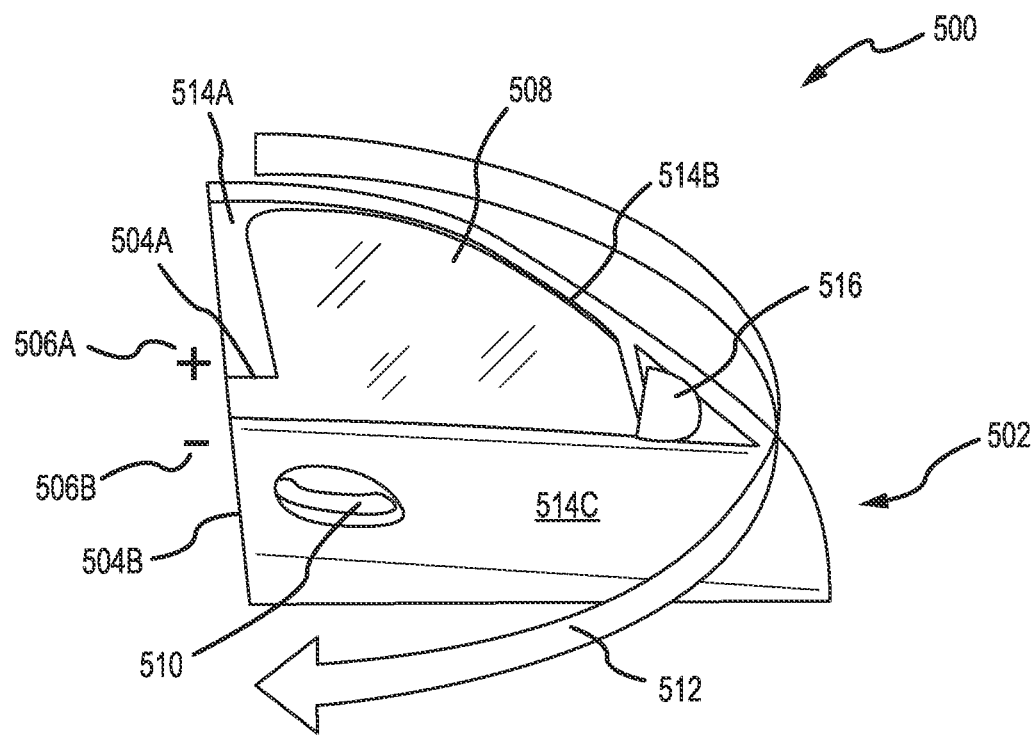
FIG. 5 illustrates a vehicle door frame constructed as an inductive sensor in accordance with some aspects of the present technology.

FIG. 5 illustrates a vehicle door constructed as an inductive sensor in accordance with some aspects of the present technology. As illustrated, an inductive sensor 500 is constructed of a door 514C of a vehicle. The inductive sensor 500 is configured to transmit electromagnetic signals when an AC flows as illustrated by an arrow 512. The door 514C includes a window 508 and a mirror 516 within an upper portion of the door frame 502 and a lower portion including a door handle 510 wherein the lower portion is coupled to the upper portion to form an integrated door frame. An electrical signal is induced between the positive electrode 506A of a current source (not shown), and the negative electrode 506B of the current source. The induced signal generates a current that follows the conductive part of the door and flows in the direction shown in 512. The door 514C is electrically isolated from the door frame 502.

In some variations, the inductive sensor 500 may also be configured to receive electromagnetic signals by measuring a change in the inductance of the inductive sensor 500.

Figure 6:
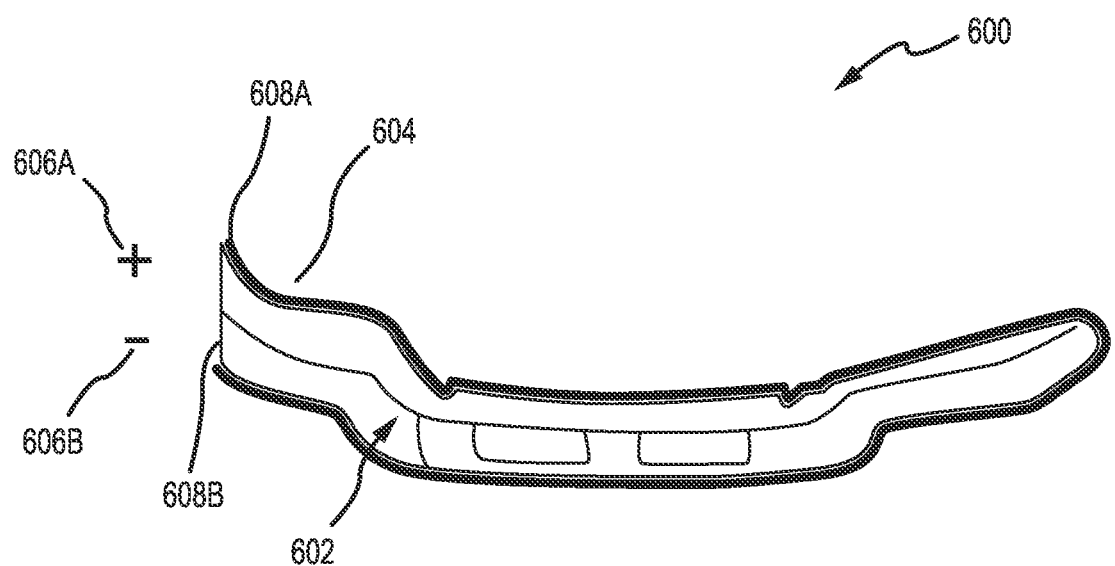
FIG. 6 illustrates a vehicle bumper constructed as an inductive sensor in accordance with some aspects of the present technology.

FIG. 6 illustrates a vehicle bumper constructed as an inductive sensor in accordance with some aspects of the present technology. As illustrated, an inductive sensor 600 is constructed of a bumper 602 of a vehicle (not shown). The inductive sensor 600 is configured to transmit electromagnetic signals when an AC flows along wire 604. As illustrated, wire 604 is wrapped around bumper 602 of the vehicle to allow an electric current or AC to flow. A first end 608A of wire 604 is connected to a positive electrode 606A of a current source (not shown), and a second end 608B of the wire is connected to a negative electrode 606B of the current source.

In some variations, the inductive sensor 600 may also be configured to receive electromagnetic signals by measuring a change in inductance of the inductive sensor 600.

Constructing Vehicle Body as Capacitive Sensor

Figure 7:
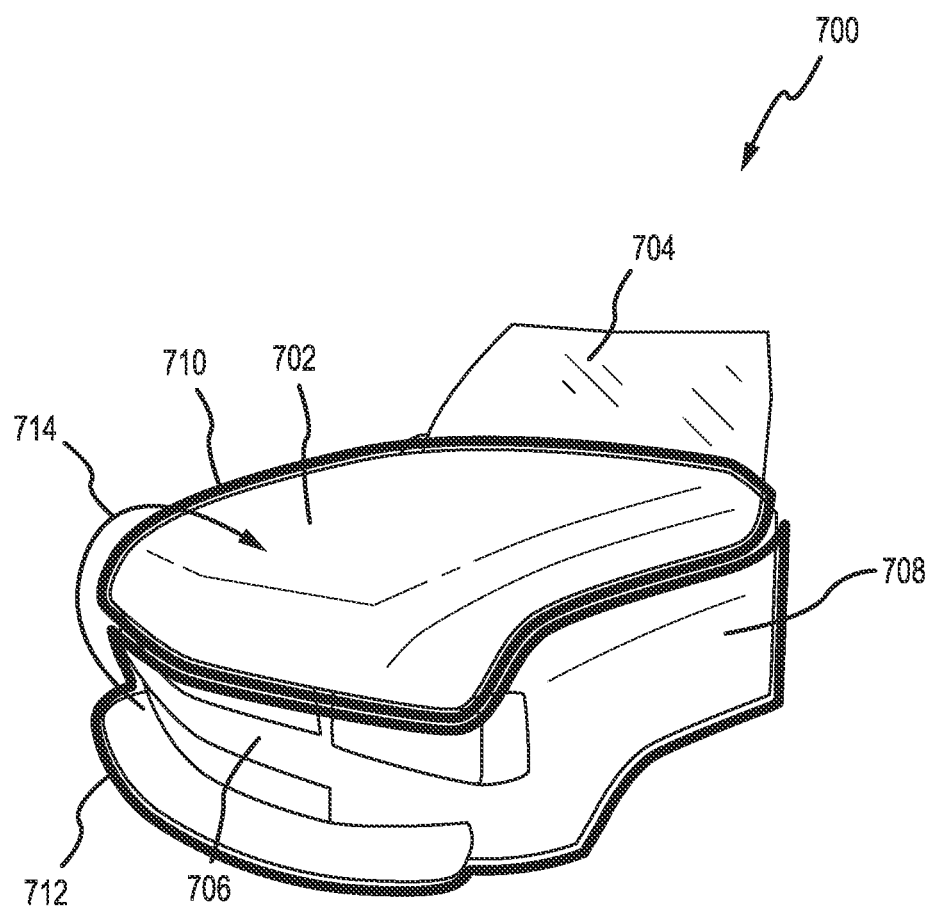
FIG. 7 illustrates a vehicle hood constructed as a capacitive sensor in accordance with some aspects of the present technology.

FIG. 7 illustrates a vehicle hood constructed as a capacitive sensor in accordance with some aspects of the present technology. As illustrated, a capacitive sensor 700 is constructed of a hood and other body parts of a vehicle (not shown). The capacitive sensor 700 is configured to transmit electromagnetic signals when an alternating voltage is applied to a first terminal (not shown) on the hood 702 and a second terminal (not shown) on the body portion 708 and generates electric fields that flow through the space on the outside of the vehicle 714. The electric field 714 interacts with metallic or other conductive objects and facilitate generation of signals that can be used detect objects. The alternating voltage may be provided from an AC voltage source (not shown). As illustrated, a hood 702 is near window 704 of a vehicle (not shown). Hood 702 of the vehicle may be constructed as the first terminal, and a body portion 708 under the hood 702 may be constructed as the second terminal, which is configured to be electrically isolated from the hood or the first terminal. A first wire 710 is wrapped around the hood 702 of the vehicle, which connects to one electrode of the AC voltage source. A second wire 712 wrapped a body portion including bumper 706 under the hood 702, which connects to another electrode of the AC voltage source. The capacitive sensor 700 may also be configured to receive electromagnetic signals by measuring a change in the capacitance of the capacitive sensor.

While the present description has demonstrated that some vehicle body parts can be used as an inductive sensor or a capacitive sensor, it should be appreciated that other vehicle body parts can be used. Likewise, body parts described as being used as an inductive sensor can be used as a capacitive sensor and vice versa. Additionally, it is not necessary that body parts be used. Special purpose sensors can be added to the vehicle.

While the present description is addressed in the context of autonomous vehicles, the technology is not limited to such environments and can be used on human piloted vehicles as well.

Figure 8:
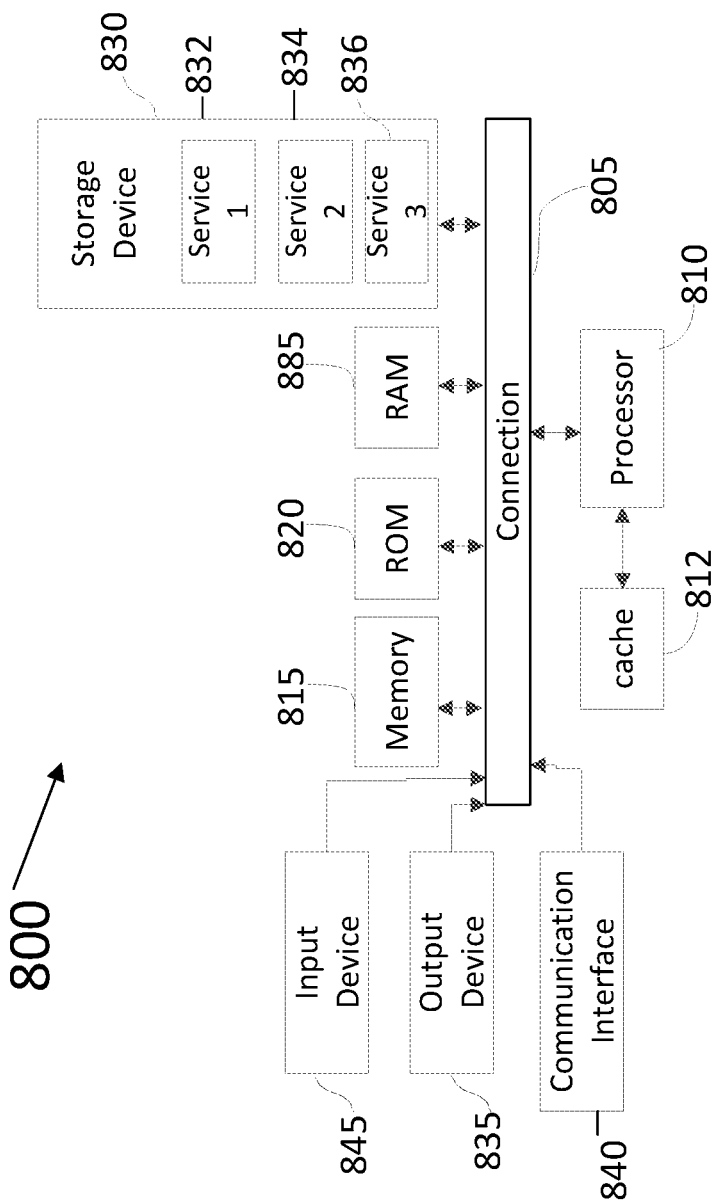
FIG. 8 is an example of a computing system in accordance with some aspects of the present technology.

FIG. 8 shows an example of computing system 800, which can be, for example, used for all the calculations as discussed above, or can be any computing device making up the local computing system 110, remote computing system 150, (potential) passenger device executing rideshare app 170, or any component thereof in which the components of the system are in communication with each other using connection 805. Connection 805 can be a physical connection via a bus, or a direct connection into processor 810, such as in a chipset architecture. Connection 805 can also be a virtual connection, networked connection, or logical connection.

In some embodiments, computing system 800 is a distributed system in which the functions described in this disclosure can be distributed within a data center, multiple data centers, a peer network, etc. In some embodiments, one or more of the described system components represents many such components each performing some or all of the function for which the component is described. In some embodiments, the components can be physical or virtual devices.

The example system 800 includes at least one processing unit (CPU or processor) 810 and connection 805 that couples various system components including system memory 815, such as read-only memory (ROM) 820 and random-access memory (RAM) 825 to processor 810. Computing system 800 can include a cache of high-speed memory 812 connected directly with, close to, or integrated as part of processor 810.

Processor 810 can include any general-purpose processor and a hardware service or software service, such as services 832, 834, and 836 stored in storage device 830, configured to control processor 810 as well as a special-purpose processor where software instructions are incorporated into the actual processor design. Processor 810 may essentially be a completely self-contained computing system, containing multiple cores or processors, a bus, memory controller, cache, etc. A multi-core processor may be symmetric or asymmetric.

To enable user interaction, computing system 800 includes an input device 845, which can represent any number of input mechanisms, such as a microphone for speech, a touch-sensitive screen for gesture or graphical input, keyboard, mouse, motion input, speech, etc. Computing system 800 can also include output device 835, which can be one or more of many output mechanisms known to those of skill in the art. In some instances, multimodal systems can enable a user to provide multiple types of input/output to communicate with computing system 800. Computing system 800 can include communications interface 840, which can generally govern and manage the user input and system output. There is no restriction on operating on any particular hardware arrangement, and therefore the basic features here may easily be substituted for improved hardware or firmware arrangements as they are developed.

Storage device 830 can be a non-volatile memory device and can be a hard disk or other types of computer-readable media which can store data that are accessible by a computer, such as magnetic cassettes, flash memory cards, solid-state memory devices, digital versatile disks, cartridges, random access memories (RAMs), read-only memory (ROM), and/or some combination of these devices.

The storage device 830 can include software services, servers, services, etc., and when the code that defines such software is executed by the processor 810, it causes the system to perform a function. In some embodiments, a hardware service that performs a particular function can include the software component stored in a computer-readable medium in connection with the necessary hardware components, such as processor 810, connection 805, output device 835, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in the memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bitstream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general-purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware, and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A sensor system comprising:
   a transmitter on a vehicle configured to transmit an electromagnetic signal in the frequency range 0.1 Hz to 10 kHz, resulting in an electromagnetic field;
   a receiver on the vehicle configured to receive a secondary electromagnetic signal from a metallic or conductive object surrounding the vehicle, wherein the secondary electromagnetic signal represents the disturbance the electromagnetic field created by the electromagnetic signal from the vehicle; and
a processor configured to:
  determine an anomaly exists in the environment around the vehicle when the magnitude of the secondary electromagnetic field is above a threshold;
  provide an input indicating that the anomaly exists in the environment to a perception stack;
  adjust parameters of one or more sensors or software that is part of the perception stack to be more sensitive to identifying a location of the anomaly;
  provide an input indicating that the anomaly exists in the environment to a prediction stack;
  spawn a simulated object in a drivable area that is occluded from direct observation by the at least one direct-object-detecting sensor; and
  control a movement of the vehicle in response to determining that the anomaly exists.

2. The sensor system of claim 1, wherein the transmitter or receiver is an inductive sensor.

3. The sensor system of claim 1, wherein the transmitter or receiver is a capacitive sensor.

4. The sensor system of claim 1, wherein the transmitter or receiver comprises an outer body portion of the vehicle that is electrically isolated from other outer portions of the vehicle.

5. The sensor system of claim 4, wherein the transmitter or receiver comprises a door frame of the vehicle or a wire that is wound about a bumper of the vehicle.

6. The sensor system of claim 1, wherein the vehicle is an autonomous vehicle (AV).

7. A method of using an electromagnetic signal to detect an occluded object, the method comprising:
  initiating a transmitter of a first vehicle, by a processor, to induce a transmitted electromagnetic signal;
  receiving secondary electromagnetic signals generated in an environment measured by a receiver on the first vehicle, wherein the secondary electromagnetic signals are generated by the transmitted electromagnetic signal interacting with metallic objects in the environment;
  determining that an anomaly exists in the environment when the measured secondary electromagnetic signals are different by greater than a threshold amount than the transmitted electromagnetic signal induced by the transmitter of the first vehicle;
  initiating a reasoning engine to determine at least one probable location for the anomaly, wherein the reasoning engine is an algorithm trained by a machine learning model; and
  training the machine learning model by:
    providing data from the direct-object-detecting sensor and data from the transmitted electromagnetic signal and the measured secondary electromagnetic signals in the environment into the machine learning model to identify a probable location for the anomaly; and
    providing labels associated with the probable location for the anomaly.

8. The method of claim 7, further comprising inferring that a second vehicle is near the first vehicle.

9. The method of claim 7, wherein each of the transmitter and the receiver comprises an electrically isolated portion of a body portion of the first vehicle.

10. The method of claim 7, wherein the transmitted electromagnetic signal has a frequency between 0.1 Hz and 10 kHz.

11. The method of claim 7, wherein to induce the transmitted electromagnetic signal is performed by inducing the electromagnetic signal by a first of the more than one electrically isolated portion of a body portion of the first vehicle, and then inducing the electromagnetic signal by a second of the more than one electrically isolated portion of a body portion of the first vehicle.

12. The method of claim 7, wherein to induce the transmitted electromagnetic signal is performed by generating a continuous waveform or a pulse.

13. The method of claim 7, wherein the secondary electromagnetic signals in the environment is measured by a first electrically isolated portion of a body portion of the first vehicle, and then measured by a second electrically isolated portion of a body portion of the first vehicle.

14. The method of claim 7, wherein the threshold is dynamically adjusted based on a preceding measurement.

15. The method of claim 7, wherein the secondary electromagnetic signals in the environment are obtained by measuring a change in capacitance.

16. The method of claim 7, wherein the secondary electromagnetic signals in the environment are obtained by measuring a change in inductance.

17. The method of claim 7, wherein the first vehicle is equipped with at least one direct-object-detecting sensor, wherein the at least one direct object detecting sensor is a LiDAR, RADAR, or camera.

18. The method of claim 7, wherein the labels associated with the probable location of the anomaly are derived from a time series of a combination of the direct-object-detecting sensor and data from the transmitted electromagnetic signal and the measured secondary electromagnetic signals in the environment, wherein the dataset comprises instances where the data from the transmitted electromagnetic signal and the secondary electromagnetic signals in the environment indicate the presence of an anomaly and later the direct-object-detecting sensor observed the cause of the anomaly.

19. The method of claim 7, further comprising:
  providing an input indicating that an anomaly exists in the environment to a perception stack;
  adjusting parameters of one or more sensors or software that is part of the perception stack to be more sensitive to identifying a location of the anomaly;
  providing an input indicating that the anomaly exists in the environment to a prediction stack;
  spawning a simulated object in a drivable area that is occluded from direct observation by the at least one direct-object-detecting sensor; and
  reducing the speed of the first vehicle after determining that the anomaly exists.

* * * * *